(12) United States Patent
Oh et al.

(10) Patent No.: US 11,366,559 B2
(45) Date of Patent: Jun. 21, 2022

(54) ANTENNA LAMINATE AND IMAGE DISPLAY DEVICE INCLUDING THE SAME

(71) Applicant: DONGWOO FINE-CHEM CO., LTD., Jeollabuk-do (KR)

(72) Inventors: Yun Seok Oh, Gyeonggi-do (KR); Young Jun Lee, Seoul (KR); Yoon Ho Huh, Seoul (KR)

(73) Assignee: DONGWOO FINE-CHEM CO., LTD., Jeollabuk-do (KR)

(*) Notice: Subject to any disclaimer, the term of this patent is extended or adjusted under 35 U.S.C. 154(b) by 87 days.

(21) Appl. No.: 16/994,897

(22) Filed: Aug. 17, 2020

(65) Prior Publication Data

US 2020/0379607 A1  Dec. 3, 2020

Related U.S. Application Data

(63) Continuation of application No. PCT/KR2020/003722, filed on Mar. 18, 2020.

(30) Foreign Application Priority Data

Mar. 20, 2019 (KR) .......................... 10-2019-0031818

(51) Int. Cl.
*H01Q 1/40* (2006.01)
*G06F 3/044* (2006.01)
*H01Q 1/48* (2006.01)

(52) U.S. Cl.
CPC .......... *G06F 3/0446* (2019.05); *G06F 3/0443* (2019.05); *H01Q 1/40* (2013.01); *H01Q 1/48* (2013.01)

(58) Field of Classification Search
None
See application file for complete search history.

(56) References Cited

U.S. PATENT DOCUMENTS

| | | | | |
|---|---|---|---|---|
| 2008/0169349 | A1* | 7/2008 | Suzuki | H01L 27/1266 235/492 |
| 2011/0050534 | A1* | 3/2011 | Shimayama | H01Q 1/3233 343/850 |
| 2011/0304520 | A1* | 12/2011 | Djordjevic | H01Q 21/0087 343/893 |
| 2014/0055688 | A1 | 2/2014 | Petcavich | |
| 2019/0165475 | A1* | 5/2019 | Shibata | H01Q 19/005 |
| 2019/0229413 | A1* | 7/2019 | Jong | H01Q 1/38 |
| 2020/0153114 | A1* | 5/2020 | Wada | H01Q 21/065 |
| 2021/0359404 | A1* | 11/2021 | Johansson | H01Q 1/52 |

FOREIGN PATENT DOCUMENTS

| | | |
|---|---|---|
| JP | 2003-332830 A | 11/2003 |
| KR | 2003-0095557 A | 12/2003 |
| KR | 10-2018-0101064 A | 9/2018 |
| KR | 10-1938779 B1 | 1/2019 |
| KR | 10-1940798 B1 | 1/2019 |
| KR | 10-2031203 B1 | 10/2019 |

* cited by examiner

*Primary Examiner* — Duane N Taylor, Jr.
(74) *Attorney, Agent, or Firm* — The PL Law Group, PLLC

(57) ABSTRACT

An antenna laminate according to an embodiment of the present invention includes a first dielectric layer and an antenna electrode layer disposed above a first ground layer, and a second dielectric layer and a second ground layer disposed below the first ground layer. The first ground layer and the second ground layer may form a ground composite to improve signal characteristics of the antenna.

16 Claims, 4 Drawing Sheets

ANTENNA LAMINATE AND IMAGE DISPLAY DEVICE INCLUDING THE SAME

CROSS-REFERENCE TO RELATED APPLICATION

The present application is a continuation application to International Application No. PCT/KR2020/003722 with the international filing date of Mar. 18, 2020, which claims priority to Korean Patent Application No. 10-2019-0031818, filed on Mar. 20, 2019, the disclosure of which is incorporated herein by reference in its entirety.

BACKGROUND

1. Field of the Invention

The present invention relates to an antenna laminate and an image display device including the same, and more specifically, to an antenna laminate including an antenna electrode layer and ground layers, and an image display device including the antenna laminate.

2. Description of the Related Art

Recently, according to development of the information-oriented society, wireless communication techniques such as Wi-Fi, Bluetooth, and the like are implemented, for example, in a form of smartphones by combining with image display devices. In this case, an antenna may be coupled to the image display device to perform a communication function.

With the recent development of mobile communication technology, an antenna for performing communication in ultra-high frequency bands (e.g., 3G to 5G) has been applied to various objects such as display devices, vehicles, and buildings.

Meanwhile, electronic devices, in which a touch panel or a touch sensor of an input device for inputting commands of a user by selecting instructions displayed on a screen with a user's finger or an object is combined with the image display device to implement image display and information input functions, are being developed. For example, as disclosed in Korean Patent Laid-Open Publication No. 2014-0092366, a touch screen panel, in which a touch sensor is coupled to various image display devices, has been developed.

By combining the antenna and the touch sensor in one image display device, it may be difficult to secure an appropriate mounting space. Further, electrical characteristics in the antenna, the touch sensor, and the display panel may be disturbed due to a mutual interference between signals.

For example, Korean Patent Laid-Open Publication No. 2003-0095557 discloses an antenna structure embedded in a portable terminal, but the consistency with other electrical elements such as a touch sensor has not been considered.

SUMMARY

It is an object of the present invention to provide an antenna laminate having improved structural efficiency and signal efficiency.

It is an object of the present invention to provide an image display device having improved structural efficiency and operational reliability.

To achieve the above objects, the following technical solutions are adopted in the present invention.

1. An antenna laminate including: a first ground layer; a first dielectric layer disposed on the first ground layer; an antenna electrode layer disposed on the first dielectric layer; a second ground layer disposed below the first ground layer; and a second dielectric layer disposed between the first ground layer and the second ground layer.

2. The antenna laminate according to the above 1, wherein the antenna electrode layer includes a radiation electrode.

3. The antenna laminate according to the above 2, the first ground layer includes a touch sensor electrode.

4. The antenna laminate according to the above 3, wherein the touch sensor electrode comprises a transparent conductive oxide.

5. The antenna laminate according to the above 2, wherein the second ground layer includes a low resistance ground electrode comprising a material having a lower resistance than the first ground layer; and the low resistance ground electrode is overlapped with or fully covered by the radiation electrode of the antenna electrode layer.

6. The antenna laminate according to the above 5, wherein the low resistance ground electrode is fully covered by the radiation electrode.

7. The antenna laminate according to the above 2, wherein the antenna electrode layer further includes: a transmission line branched from the radiation electrode; and a signal pad connected to end of the transmission line.

8. The antenna laminate according to the above 7, further including a ground pad around the signal pad, the ground pad electrically separated from the signal pad and the transmission line.

9. The antenna laminate according to the above 1, wherein the second ground layer includes metal having a lower resistance than the first ground layer.

10. The antenna laminate according to the above 1, wherein the second dielectric layer has a thickness of 1 to 500 μm.

11. The antenna laminate according to the above 1, wherein the first dielectric layer has a thickness of 200 μm or more.

12. The antenna laminate according to the above 1, wherein the antenna electrode layer has a mesh structure.

13. The antenna laminate according to the above 1, wherein the first dielectric layer includes an adhesive layer.

14. The antenna laminate according to the above 1, further including a first adhesive layer disposed between the antenna electrode layer and the first dielectric layer, and a second adhesive layer disposed between the first dielectric layer and the first ground layer.

15. An image display device including: the antenna laminate according to the above 1; and a display panel comprising an electrode structure and an encapsulation layer formed on the electrode structure, wherein the electrode structure of the display panel is provided as the second ground layer of the antenna laminate; and the encapsulation layer is the second dielectric layer of the antenna laminate.

16. The antenna laminate according to claim 3, wherein the second ground layer comprises a low resistance ground electrode comprising a material having a lower resistance than the touch sensor electrode.

17. The antenna laminate according to claim 16, wherein the low resistance ground electrode is overlapped with or fully covered by the radiation electrode of the antenna electrode layer.

18. An image display device comprising: a first ground layer; a first dielectric layer disposed on the first ground layer; an antenna electrode layer disposed on the first dielectric layer; and a display panel comprising: an electrode structure comprising a second ground layer disposed below the first ground layer; and an encapsulation layer comprising a second dielectric layer disposed between the first ground layer and the second ground layer.

In the antenna laminate according to embodiments of the present invention, the antenna electrode layer, the first ground layer, and the second ground layer may be respectively disposed with the first dielectric layer and the second dielectric layer interposed therebetween. The second ground layer may form a ground composite together with the first ground layer, thus to improve signal characteristics of the antenna (antenna gain and efficiency).

According to exemplary embodiments, the first ground layer may include a touch sensor electrode. In this case, the antenna laminate may simultaneously perform functions of the antenna and the touch sensor. Thereby, space utilization may be improved and needs for decreasing a thickness of the antenna may be achieved.

According to exemplary embodiments, the touch sensor electrode may include a transparent conductive oxide. Therefore, visibility of an image may be improved when laminating the antenna laminate on the image display device.

According to exemplary embodiments, the second ground layer may include metal having a lower resistance than the first ground layer. In this case, the second ground layer may supplement and improve the performance of the first ground layer as a ground layer. Thereby, the signal characteristics of the antenna may be improved.

According to exemplary embodiments, the antenna electrode layer may have a mesh structure. Thereby, when disposing the antenna laminate on the display panel, a deterioration in visibility of an image may be prevented.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
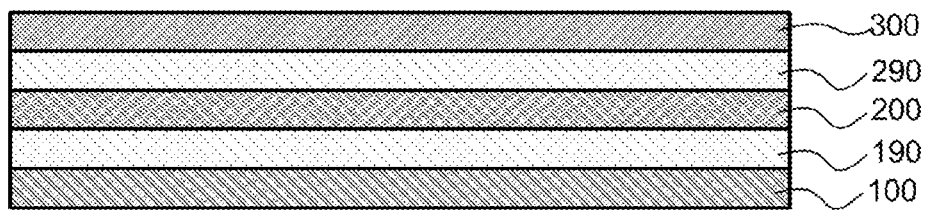
FIG. 1 is a schematic cross-sectional view illustrating an antenna laminate according to exemplary embodiments.

Embodiments of the present invention provide an antenna laminate in which a first dielectric layer and an antenna electrode layer are disposed above a first ground layer, and a second dielectric layer and a second ground layer are disposed below the first ground layer.

The antenna laminate may be utilized as, for example, a microstrip patch antenna manufactured in a form of a transparent film. The antenna laminate may be applied to, for example, a communication device for performing communication in high frequency or ultra-high frequency bands (for example, mobile communication on 3G, 4G and 5G networks, etc.).

Hereinafter, exemplary embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

FIG. 1 is a schematic cross-sectional view illustrating an antenna laminate according to exemplary embodiments.

Referring to FIG. 1, the antenna laminate may include a first ground layer 200, a first dielectric layer 290, an antenna electrode layer 300, a second dielectric layer 190, and a second ground layer 100.

The first ground layer 200 may be coupled to the antenna electrode layer 300 with the first dielectric layer 290 interposed therebetween to form capacitance or inductance. In this case, vertical radiation characteristics may be implemented.

The first ground layer 200 may include, for example, metal, a metal alloy, or a metal oxide having a predetermined conductivity.

The first dielectric layer 290 may be disposed on the first ground layer 200. For example, the first dielectric layer 290 may be in contact with the first ground layer 200, or another member may be disposed between the first dielectric layer 290 and the first ground layer 200.

The first dielectric layer 290 may include, for example, a transparent resin material. For example, the first dielectric layer 290 may include a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acryl resin such as polymethyl (meth)acrylate, polyethyl (meth)acrylate, etc.; a styrene resin such as polystyrene, acrylonitrile-styrene copolymer, etc.; a polyolefin resin such as polyethylene, polypropylene, cyclic polyolefin or polyolefin having a norbornene structure, ethylene-propylene copolymer, etc.; a vinyl chloride resin; a polyimide resin such as nylon, aromatic polyimide; an imide resin; a polyether sulfonic resin; a sulfonic resin; a polyether ether ketone resin; a polyphenylene sulfide resin; a vinylalcohol resin; a vinylidene chloride resin; a vinyl butyral resin; an allylate resin; a polyoxymethylene resin; a thermoplastic resin such as an epoxy resin and the like. These compounds may be used alone or in combination of two or more thereof.

In addition, a transparent film made of a thermosetting resin or an ultraviolet curable resin such as (meth)acrylate, urethane, acrylic urethane, epoxy, silicone, and the like may be used as the first dielectric layer 290.

In some embodiments, an adhesive film such as an optically clear adhesive (OCA), an optically clear resin (OCR), and the like may also be included in the first dielectric layer 290.

In some embodiments, the first dielectric layer 290 may include an inorganic insulation material such as a silicon oxide, silicon nitride, silicon oxynitride, glass and the like.

In one embodiment, the first dielectric layer 290 may be provided in a substantially single layer. In one embodiment, the first dielectric layer 290 may also include a multi-layered structure of two or more layers.

Capacitance or inductance may be formed between the antenna electrode layer 300 and the first ground layer 200 by the first dielectric layer 290, thus to adjust a frequency band in which the antenna structure can be driven or sensed. In some embodiments, a dielectric constant of the first dielectric layer 290 may be adjusted to a range of about 1.5 to 12. When the dielectric constant thereof exceeds about 12, a driving frequency is excessively reduced, such that driving of the antenna in a desired high frequency band may not be implemented.

In exemplary embodiments, the first dielectric layer 290 may have a thickness of 200 μm or more. When the thickness of the first dielectric layer 290 is less than 200 μm, a distance between the antenna electrode layer 300 and the first ground layer 200 may be excessively close. In this case, gain and efficiency of the antenna may be reduced. Preferably, the first dielectric layer 290 has a thickness of 300 μm or more. In this case, the gain and efficiency of the antenna may be improved to 5 dB or more and 60% or more, respectively. More preferably, the first dielectric layer 290 has a thickness of 400 μm or more.

The antenna electrode layer 300 may be disposed on the first dielectric layer 290. For example, the antenna electrode layer 300 may be in contact with the first dielectric layer 290, or another member may be disposed between the antenna electrode layer 300 and the first dielectric layer 290.

Figure 4:
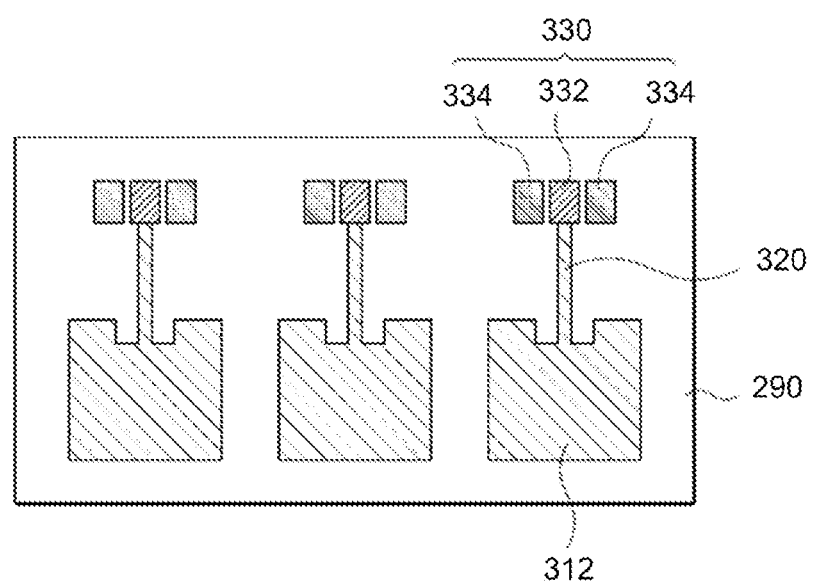
FIGS. 4 and 5 are schematic plan views illustrating an antenna electrode layer according to some embodiments, respectively.

FIG. 4 is a schematic plan view illustrating an antenna electrode layer according to some embodiments.

Referring to FIG. 4, the antenna electrode layer 300 may include a radiation electrode 312, a transmission line 320, and a bundle of pads 330. The pads 330 may include a signal pad 332 and ground pads 334.

For example, the radiation electrode 312 may have a polygonal plate shape, and the transmission line 320 may extend from a central portion of the radiation electrode 312 to be electrically connected to one end of the signal pad 332. The transmission line 320 may be formed as a substantially integral single member with the radiation electrode 312.

In some embodiments, a pair of ground pads 334 may be disposed with the signal pad 332 interposed therebetween. The ground pads 334 may be electrically separated from the signal pad 332 and the transmission line 320.

The antenna electrode layer 300 may be overlapped with the first ground layer 200 in a thickness direction of the antenna laminate. For example, the radiation electrode 312 of the antenna electrode layer 300 may be at least partially overlapped with an electrode structure included in the first ground layer 200.

The antenna electrode layer 300 may include metal such as silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or alloys thereof. These metals may be used alone or in combination of two or more thereof. For example, to implement a low resistance in the antenna, silver or a silver alloy (e.g., a silver-palladium-copper (APC) alloy) may be used.

In one embodiment, the antenna electrode layer 300 may include copper (Cu) or a copper alloy (e.g., a copper-calcium (CuCa) alloy) in consideration of the low resistance and fine line width patterning.

In some embodiments, the antenna electrode layer 300 may include a transparent conductive oxide such as indium tin oxide (ITO), indium zinc oxide (IZO), indium zinc tin oxide (IZTO), or zinc oxide (ZnOx).

In some embodiments, the antenna electrode layer 300 may include a lamination structure of a transparent conductive oxide layer and a metal layer, for example, may have a three-layered structure of transparent conductive oxide layer-metal layer-transparent conductive oxide layer. In this case, a signal transmission speed may be increased by lowering the resistance while improving flexible properties by the metal layer, and corrosion resistance and transparency may be improved by the transparent conductive oxide layer.

Figure 5:
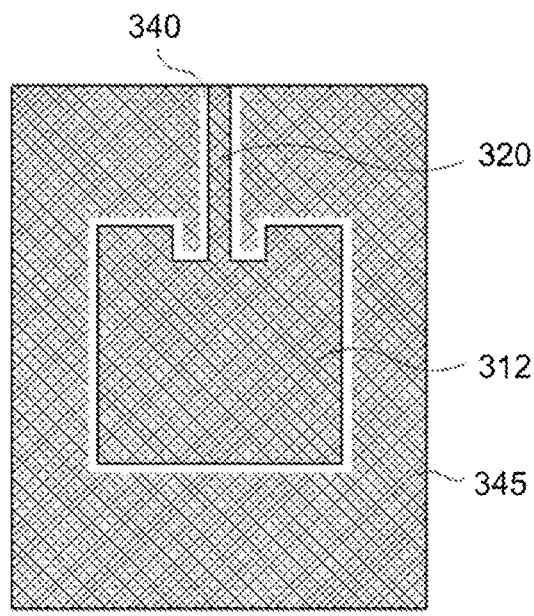

FIG. 5 is a schematic plan view illustrating an antenna electrode layer according to some embodiments.

Referring to FIG. 5, the radiation electrode 312 may have a mesh structure. In this case, a transmittance of the radiation electrode 312 may be improved, and when mounting the antenna structure on a display device, it is possible to prevent the radiation electrode 312 from being viewed by a user. In one embodiment, the transmission line 320 may also be patterned together with the radiation electrode 312 to have a mesh structure.

In some embodiments, a dummy pattern 345 of a mesh structure may be formed around the radiation electrode 312. In one embodiment, the radiation electrode 312 may also have the mesh structure substantially the same as or similar to the dummy pattern 345.

For example, the radiation electrode 312 and the dummy pattern 345 may be separated and insulated from each other by a separation region 340 formed along edges of the radiation electrode 312.

By forming the radiation electrode 312 and the dummy pattern 345 so as to include substantially the same or similar mesh structure, it is possible to prevent visibility of the radiation electrode 312 due to a difference in a pattern shape while improving the transmittance of the antenna electrode layer 300.

In some embodiments, the transmission line 320 branched from the radiation electrode 312 may also have the mesh structure. In one embodiment, the pad 330 shown in FIG. 4 may have a solid pattern structure for improving the signal transmission speed and decreasing the resistance.

In exemplary embodiments, the first ground layer 200 may include a touch sensor electrode.

Figure 2:
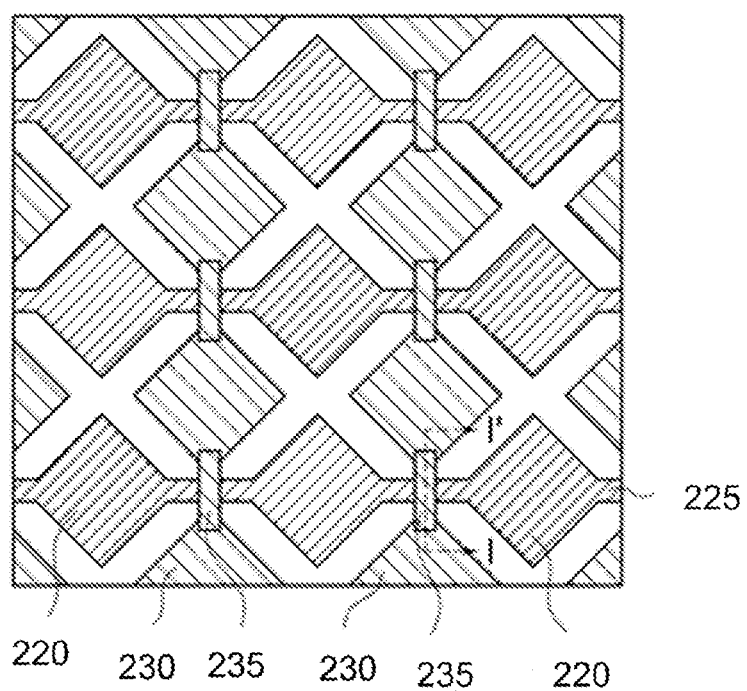
FIGS. 2 and 3 are a schematic plan view and a cross-sectional view illustrating a touch sensor electrode according to some embodiments, respectively.
Figure 3:
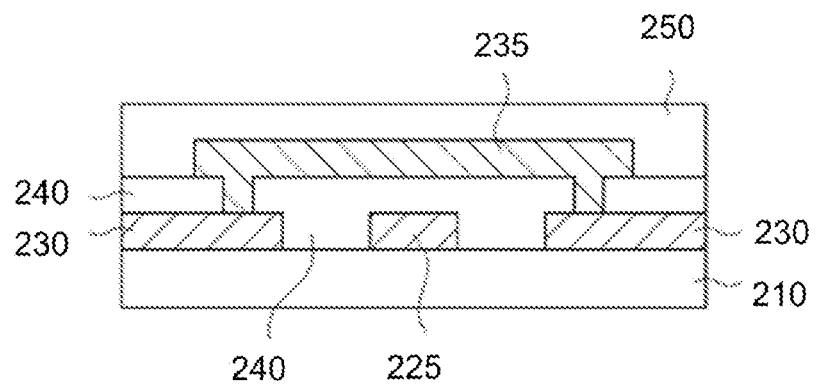

FIGS. 2 and 3 are a schematic plan view and a cross-sectional view illustrating the touch sensor electrode according to some embodiments, respectively. For example, FIG. 3 is a cross-sectional view taken on line I-I' of FIG. 2.

Referring to FIGS. 2 and 3, the touch sensor electrode may include sensing electrodes arranged on a support layer 210. For example, the support layer 210 may include a resin material such as a cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), polymethylmethacrylate (PMMA) and the like.

In some embodiments, the support layer 210 may include an inorganic insulation material such as a silicon oxide, silicon nitride, silicon oxynitride, glass and the like.

In exemplary embodiments, the second dielectric layer 190 may be provided as the support layer 210.

The sensing electrodes may include sensing electrodes which are arranged in different directions from each other on a plane. The sensing electrodes may include first sensing electrodes 220 and second sensing electrodes 230 which are arranged so as to cross each other.

The first sensing electrodes 220 may be arranged in, for example, a row direction (e.g., an X direction). The second sensing electrodes 230 may be arranged in, for example, a column direction (e.g., a Y direction).

The first sensing electrode 220 and the second sensing electrode 230 may provide information on an X coordinate and a Y coordinate of the touched point, respectively. For example, when a pressure is applied to the touch sensor laminate by user's finger or an object, an electrical signal may be generated due to a change in capacitance through the first sensing electrode 220 and the second sensing electrode 230. The generated electrical signal may be transferred to a driving circuit side via, for example, position detection lines.

Each of the second sensing electrodes 230 may have an island shape spaced apart from each other. Meanwhile, the first sensing electrodes 220 may be integrally connected to each other through a connection part 225 in the row direction (for example, the X direction).

When the first sensing electrode 220 and the second sensing electrode 230 are disposed on the same level as each other, bridge electrodes 235 may be further formed to connect the second sensing electrodes 230 to each other while insulating them from the first sensing electrodes 220. The bridge electrode 235 may electrically connect the adjacent second sensing electrodes 230 to each other in the column direction (e.g., the y direction).

As shown in FIG. 3, an insulation layer 240 may at least partially cover the sensing electrodes 220 and 230. In some embodiments, the insulation layer 240 may cover the first sensing electrode 220 or the connection part 225, as well as may partially cover the second sensing electrodes 230. For example, the insulation layer 240 may include contact holes from which top surfaces of the second sensing electrodes 230 are partially exposed.

The insulation layer 240 may be made of a transparent insulation material. For example, the insulation layer 240 may be formed by using an inorganic insulation material such as a silicon oxide or a transparent organic material such as an acrylic resin.

The bridge electrode 235 may be disposed on the insulation layer 240 to electrically connect a pair of neighboring second sensing electrodes 230 to each other. For example, the bridge electrode 235 may cross each other with the connection part 225 on the insulation layer 240. The bridge electrode 235 may fill the contact holes formed in the insulation layer 240.

The sensing electrodes 220 and 230 and the bridge electrode 235 may include a transparent conductive oxide or metal. The transparent conductive oxide may include, for example, indium tin oxide (ITO), indium zinc oxide (IZO), zinc oxide (ZnO), indium zinc tin oxide (IZTO), cadmium tin oxide (CTO) and the like. The metal may include, for example, silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo) or alloys thereof.

Preferably, the touch sensor electrode is made of a transparent conductive oxide. In this case, when laminating the antenna laminate on the display device, a deterioration in the visibility of an image may be effectively suppressed.

In some embodiments, the sensing electrodes 220 and 230 and/or the bridge electrode 235 may have a multi-layered structure. For example, the sensing electrodes 220 and 230 and/or the bridge electrode 235 may have a structure in which a transparent oxide layer and a metal layer are laminated.

In some embodiments, the first sensing electrode 220 and the second sensing electrode 230 may be formed at different levels from each other. For example, one of the first sensing electrode 220 and the second sensing electrode 230 may be formed on the insulation layer 240 and the other may be formed under the insulation layer 240. In this case, the bridge electrode 235 may be omitted, and both the first sensing electrode 220 and the second sensing electrode 230 may include the connection part.

In some embodiments, the sensing electrodes may be formed in dependent island patterns, respectively, to be provided as separate sensing domains, respectively.

In exemplary embodiments, the touch sensor electrode may be covered with a passivation layer 250. The passivation layer 250 may include an inorganic insulation material, an organic insulation material or an organic-inorganic hybrid film. The passivation layer 250 may be provided as a sealing layer for protecting the touch sensor electrode.

In exemplary embodiments, the touch sensor electrode may be at least partially overlapped with the radiation electrode 312 in a vertical direction or in a height (thickness) direction of the antenna laminate. Therefore, the touch sensor electrode may be provided as a ground of the antenna electrode layer 300. For example, the radiation electrode 312 and the touch sensor electrode may be coupled with each other to transmit and receive antenna signals. In some embodiments, the radiation electrode 312 may be overlapped with the touch sensor electrode as a whole. In this case, a coupling area of the radiation electrode 312 with the touch sensor electrode may be increased, and the gain and efficiency of the antenna may be improved.

The second ground layer 100 may be disposed below the first ground layer 200. The second ground layer 100 may form a ground composite with the first ground layer 200. The ground composite may serve as one ground layer to improve a performance of the ground layer (i.e., a grounding performance).

For example, if the grounding performance of the first ground layer 200 is insufficient (e.g., if the resistance of the ground layer is high, a radiation efficiency is decreased due to electrical losses), the second ground layer 100 may supplement and increase the grounding performance of the first ground layer 200 to improve the grounding performance of the ground composite as a whole.

The second ground layer 100 may include, for example, metal, a metal alloy, or a metal oxide having a predetermined conductivity.

For example, when the first ground layer 200 and the touch sensor electrode include a transparent conductive oxide, a resistance (a surface resistance) of the transparent conductive oxide may be greater than that of the metal or the metal alloy. Therefore, the grounding performance of the first ground layer 200 may be decreased to reduce the gain and efficiency of the antenna.

According to exemplary embodiments, the second ground layer 100 may be disposed below the first ground layer 200 so that the second ground layer 100 and the first ground layer 200 form the ground composite. Therefore, the second ground layer 100 may supplement the insufficient grounding performance of the first ground layer 200. In this case, the grounding performance of the entire ground composite to be coupled to the antenna electrode layer 300 may be improved. Accordingly, when using the transparent conductive oxide as a material of the first ground layer 200, the gain and efficiency of the antenna may be improved while implementing enhanced visibility of the image.

In exemplary embodiments, the second ground layer 100 may include metal having a lower resistance than the first ground layer 200. Therefore, when forming the ground composite, it is possible to effectively improve the grounding performance of the first ground layer 200.

In exemplary embodiments, the second ground layer 100 may include a low resistance ground electrode. The low resistance ground electrode may be made of a material having a lower resistance than the first ground layer 200. The low resistance ground electrode may be made of a material having a lower resistance than the touch sensor electrode. The low resistance ground electrode may include, for example, an electrode structure of the display panel. The electrode structure may include a gate electrode, a source electrode, a drain electrode, and/or a pixel electrode of the display panel.

In exemplary embodiments, the low resistance ground electrode may be at least partially overlapped with the radiation electrode 312 in the vertical direction or in the height (thickness) direction of the antenna laminate. Therefore, the low resistance ground electrode may be provided as the ground of the antenna electrode layer 300. For example, the radiation electrode 312 and the low resistance ground electrode may be coupled with each other to transmit and receive the antenna signals. Due to the overlapped structure, the grounding performance resulting from the second ground layer 100 may be improved.

In some embodiments, the radiation electrode 312 may be overlapped with the low resistance ground electrode as a whole. In this case, the coupling area of the radiation electrode 312 with the low resistance ground electrode may be increased, and the gain and efficiency of the antenna may be improved.

The second dielectric layer 190 may be disposed between the first ground layer 200 and the second ground layer 100. For example, the second dielectric layer 190 may be in contact with the first ground layer 200 and the second ground layer 100, or another member may be disposed between the second dielectric layer 190 and the first or second ground layer 200 or 100.

The second dielectric layer 190 may include, for example, a transparent resin material. For example, the second dielectric layer 190 may include a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acryl resin such as polymethyl (meth)acrylate, polyethyl (meth)acrylate, etc.; a styrene resin such as polystyrene, acrylonitrile-styrene copolymer, etc.; a polyolefin resin such as polyethylene, polypropylene, cyclic polyolefin or polyolefin having a norbornene structure, ethylene-propylene copolymer, etc.; a vinyl chloride resin; a polyimide resin such as nylon, aromatic polyimide; an imide resin; a polyether sulfonic resin; a sulfonic resin; a polyether ether ketone resin; a polyphenylene sulfide resin; a vinylalcohol resin; a vinylidene chloride resin; a vinyl butyral resin; an allylate resin; a polyoxymethylene resin; a thermoplastic resin such as an epoxy resin and the like. These compounds may be used alone or in combination of two or more thereof.

In addition, a transparent film made of a thermosetting resin or an ultraviolet curable resin such as (meth)acrylate, urethane, acrylic urethane, epoxy, silicone, and the like may be used as the second dielectric layer 190. In some embodiments, an adhesive film such as an optically clear adhesive (OCA), an optically clear resin (OCR), or the like may also be included in the second dielectric layer 190.

In some embodiments, the second dielectric layer 190 may include an inorganic insulation material such as a silicon oxide, silicon nitride, silicon oxynitride, glass and the like.

In one embodiment, the second dielectric layer 190 may be provided in a substantially single layer. In one embodiment, the second dielectric layer 190 may also include a multi-layered structure of two or more layers.

Capacitance or inductance may be formed between the first ground layer 200 and the second ground layer 100 by the second dielectric layer 190 to form the ground composite. It is possible to adjust a frequency band in which the antenna laminate can be driven or sensed by the second dielectric layer 190. In some embodiments, the dielectric constant of the second dielectric layer 190 may be adjusted in a range of about 1.5 to 12. When the dielectric constant thereof exceeds about 12, the driving frequency is excessively reduced, such that driving of the antenna in a desired high frequency band may not be implemented.

In exemplary embodiments, the second dielectric layer 190 may have a thickness of 1 to 500 μm. When the thickness of the second dielectric layer 190 exceeds 500 μm, the grounding performance improvement effect due to the formation of the ground composite may not be substantially implemented. Preferably, the second dielectric layer 190 has a thickness of 1 to 400 μm, and more preferably 1 to 150 μm.

Figure 6:
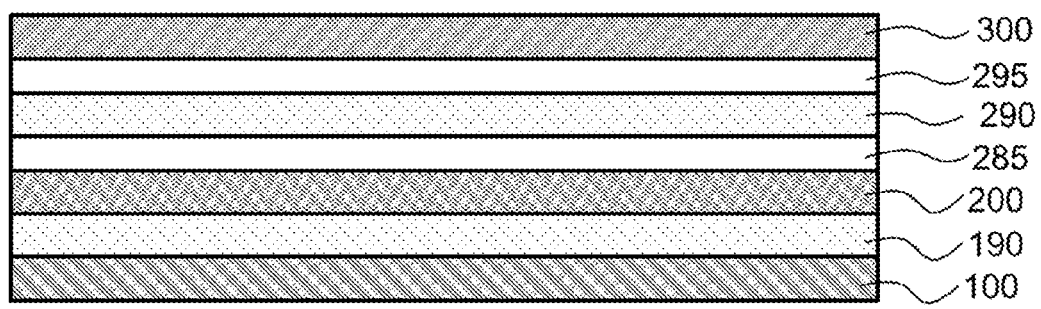
FIG. 6 is a schematic cross-sectional view illustrating an antenna laminate according to exemplary embodiments.

FIG. 6 is a schematic cross-sectional view illustrating an antenna laminate according to exemplary embodiments. The components having substantially the same configuration as the components described with reference to FIG. 1 will not be described.

Referring to FIG. 6, a first adhesive layer 295 may be disposed between the antenna electrode layer 300 and the first dielectric layer 290, and a second adhesive layer 285 may be disposed between the first dielectric layer 290 and the first ground layer 200.

The first adhesive layer 295 and the second adhesive layer 285 may include an adhesive film such as an optically clear adhesive (OCA), an optically clear resin (OCR) or the like.

In exemplary embodiments, the antenna electrode layer 300 and the first ground layer 200 may be electrically and physically separated from each other by the first dielectric layer 290. In addition, these layers may be connected to each other by a via or contact penetrating the first dielectric layer 290.

In exemplary embodiments, the first ground layer 200 and the second ground layer 100 may be electrically and physically separated from each other by the second dielectric layer 190. In addition, these layers may be connected to each other by a via or contact penetrating the second dielectric layer 190.

Figure 7:
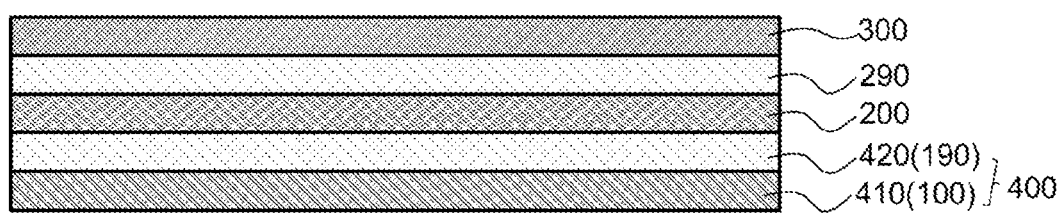
FIG. 7 is a schematic cross-sectional view illustrating an image display device according to exemplary embodiments.

FIG. 7 is a schematic cross-sectional view illustrating an image display device according to exemplary embodiments.

Referring to FIG. 7, the image display device may include the antenna electrode layer 300, the first dielectric layer 290, and a display panel 400.

The display panel 400 may include, for example, a thin film transistor (TFT) array substrate or a back-plane substrate of a display device such as an organic light emitting diode (OLED) display device or a liquid crystal display (LCD) device.

The display panel 400 may include an electrode structure 410 and an encapsulation layer 420.

The electrode structure 410 may include a gate electrode, a source electrode, and a drain electrode included in the thin film transistor (TFT) array of the display panel 400. In addition, the electrode structure 410 may include a pixel electrode of the display panel 400.

For example, the gate electrode, the source electrode, the drain electrode, and the pixel electrode may include low resistance metal such as are silver (Ag), gold (Au), copper (Cu), molybdenum (Mo), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), or alloys thereof, respectively.

The encapsulation layer 420 may include an inorganic insulation material, an organic insulation material, or an organic-inorganic hybrid film. The encapsulation layer 420 may be provided as a sealing layer for protecting the thin film transistor (TFT), the electrodes, and the display layer included in the display panel 400. In one embodiment, the encapsulation layer 420 may be manufactured together as a component or member included in the display panel 400.

In exemplary embodiments, the electrode structure 410 may be provided as the second ground layer 100. In addition, the encapsulation layer 420 may be provided as the second dielectric layer 190. In this case, the antenna laminate having the ground composite formed therein may be implemented by disposing the display panel 400 below the first ground layer 200 without additionally forming separate second dielectric layer and second ground layer. Therefore, a thin type image display device including a touch sensor and an antenna function may be formed in a simple manner, and an operation interference of the image display device due to a separate ground layer may be prevented.

Hereinafter, experimental examples including specific examples and comparative example will be described to more concretely understand the present invention. However, those skilled in the art will appreciate that such examples are provided for illustrative purposes and do not limit subject matters to be protected as disclosed in appended claims. Therefore, it will be apparent to those skilled in the art various alterations and modifications of the embodiments are possible within the scope and spirit of the present invention and duly included within the range as defined by the appended claims.

Examples 1 to 8

An antenna electrode layer was formed on an upper surface of a polyimide dielectric layer using a silver-palladium-copper (APC) alloy.

Then, a touch electrode layer including sensing electrodes made of indium tin oxide (ITO) having a thickness of 3 to 4 μm was adhered below the dielectric layer.

A distance between the antenna electrode layer and the touch electrode layer was adjusted to 400 μm.

A lower surface of the touch electrode layer was adhered to an OLED panel to prepare an image display device.

Distances between the touch electrode layer and the electrode structure (a TFT electrode and a pixel electrode) of the OLED panel were adjusted as shown in Table 1 below.

Comparative Example 1

An antenna electrode layer was formed on an upper surface of a polyimide dielectric layer using a silver-palladium-copper (APC) alloy.

Then, a touch electrode layer including sensing electrodes made of indium tin oxide (ITO) having a thickness of 3 to 4 μm was adhered below the dielectric layer.

An antenna laminate of Comparative Example 1 was prepared by adjusting the distance between the antenna electrode layer and the touch electrode layer to 400 μm.

Experimental Example—Evaluation of Signal Characteristics of Antenna

S-parameters (S11, return losses) and antenna efficiencies were extracted from the image display devices and the antenna laminate prepared in the examples and comparative example at a frequency of about 27.5 to 28.5 GHz with an impedance of 50Ω using a network analyzer, and results thereof are shown in Table 1 below.

TABLE 1

|  | Distance between touch electrode layer and electrode structure of OLED panel (μm) | S11 (dB) | Efficiency (%) |
| --- | --- | --- | --- |
| Example 1 | 10 | −9.08 | 87.1 |
| Example 2 | 25 | −9.10 | 87.2 |
| Example 3 | 50 | −9.47 | 88.7 |
| Example 4 | 100 | −7.82 | 83.5 |
| Example 5 | 150 | −7.02 | 80.2 |
| Example 6 | 240 | −4.53 | 64.8 |
| Example 7 | 380 | −4.01 | 60.3 |
| Example 8 | 480 | −3.41 | 54.4 |
| Comparative Example 1 | OLED panel (none) | −3.40 | 53.3 |

Referring to Table 1, it can be seen that antenna performances of the examples were improved compared to those of the comparative example which does not include the OLED panel used as the second ground layer in the examples.

Reference Examples 1-9

An antenna electrode layer made of a silver-palladium-copper (APC) alloy was disposed on a polyimide dielectric layer, and a ground layer made of an APC alloy ('APC ground layer') having a thickness of 2400 Å was formed below the dielectric layer. A resistance of the APC ground layer was 0.15 kW.

Antenna characteristics were evaluated in the same manner as the experimental example while adjusting the thicknesses of the dielectric layers as shown in Table 2 below.

TABLE 2

|  | Thickness of dielectric layer (μm) | Radiation Efficiency (%) | Gain (dBi) | Directivity (dBi) |
| --- | --- | --- | --- | --- |
| Reference Example 1 | 10 | 0.13 | −28.23 | 7.72 |
| Reference Example 2 | 50 | 0.45 | −15.48 | 8.04 |
| Reference Example 3 | 100 | 18 | 0.14 | 7.54 |
| Reference Example 4 | 200 | 43.7 | 3.2 | 7.32 |
| Reference Example 5 | 300 | 64.3 | 5.35 | 7.27 |
| Reference Example 6 | 400 | 78.0 | 5.6 | 7.18 |
| Reference Example 7 | 500 | 80.3 | 6.18 | 7.14 |
| Reference Example 8 | 700 | 85 | 6.35 | 7.07 |
| Reference Example 9 | 1000 | 87.8 | 6.15 | 6.8 |

Referring to Table 2, it can be seen that the antenna efficiencies and gains of the reference examples were increased as the thickness of the dielectric layer was increased. When the thickness of the dielectric layer is 200 μm or more, the reference examples exhibited the antenna efficiencies and gains to be available as an antenna. When the thickness of the dielectric layer is 300 μm or more, the reference examples exhibited excellent antenna efficiencies and gains, and the antenna efficiencies and gains were substantially saturated (i.e., were substantially not further increased anymore) in a section in which the thickness of the dielectric layer is 400 μm more.

What is claimed is:

1. An antenna laminate comprising:
a first ground layer;
a first dielectric layer disposed on the first ground layer;
an antenna electrode layer disposed on the first dielectric layer, the antenna electrode layer comprising a radiation electrode, a transmission line branched from the radiation electrode, and a signal pad connected to an end of the transmission line;
a second ground layer disposed below the first ground layer; and
a second dielectric layer disposed between the first ground layer and the second ground layer.

2. The antenna laminate according to claim 1, the first ground layer comprises a touch sensor electrode.

3. The antenna laminate according to claim 2, wherein the touch sensor electrode comprises a transparent conductive oxide.

4. The antenna laminate according to claim 1, wherein the second ground layer comprises a low resistance ground electrode comprising a material having a lower resistance than the first ground layer; and
the low resistance ground electrode is overlapped with or fully covered by the radiation electrode of the antenna electrode layer.

5. The antenna laminate according to claim 4, wherein the low resistance ground electrode is fully covered by the radiation electrode.

6. The antenna laminate according to claim 1, further comprising a ground pad around the signal pad, the ground pad electrically separated from the signal pad and the transmission line.

7. The antenna laminate according to claim 1, wherein the second ground layer comprises metal having a lower resistance than the first ground layer.

8. The antenna laminate according to claim 1, wherein the second dielectric layer has a thickness of 1 to 500 μm.

9. The antenna laminate according to claim 1, wherein the first dielectric layer has a thickness of 200 μm or more.

10. The antenna laminate according to claim 1, wherein the antenna electrode layer has a mesh structure.

11. The antenna laminate according to claim 1, wherein the first dielectric layer comprises an adhesive layer.

12. The antenna laminate according to claim 1, further comprising a first adhesive layer disposed between the antenna electrode layer and the first dielectric layer, and a second adhesive layer disposed between the first dielectric layer and the first ground layer.

13. An image display device comprising:
the antenna laminate according to claim 1; and
a display panel comprising an electrode structure and an encapsulation layer formed on the electrode structure,
wherein the electrode structure of the display panel is the second ground layer of the antenna laminate; and
the encapsulation layer of the display panel is the second dielectric layer of the antenna laminate.

14. The antenna laminate according to claim 2, wherein the second ground layer comprises a low resistance ground electrode comprising a material having a lower resistance than the touch sensor electrode.

15. The antenna laminate according to claim 14, wherein the low resistance ground electrode is overlapped with or fully covered by the radiation electrode of the antenna electrode layer.

16. An image display device comprising:
a first ground layer;
a first dielectric layer disposed on the first ground layer;
an antenna electrode layer disposed on the first dielectric layer; and
a display panel comprising:
an electrode structure comprising a second ground layer disposed below the first ground layer; and
an encapsulation layer comprising a second dielectric layer disposed between the first ground layer and the second ground layer.

* * * * *